United States Patent [19]

Strelow et al.

[11] Patent Number: 4,842,014

[45] Date of Patent: Jun. 27, 1989

[54] CHECK VALVE HANGER MECHANISM

[75] Inventors: John L. Strelow, Broken Arrow; Robert I. Clarkson, Tulsa, both of Okla.

[73] Assignee: Wheatley Pump and Valve, Inc., Del.

[21] Appl. No.: 140,735

[22] Filed: Jan. 4, 1988

Related U.S. Application Data

[63] Continuation of Ser. No. 885,790, Jul. 15, 1986, abandoned.

[51] Int. Cl.[4] ............................................. F16K 15/03
[52] U.S. Cl. ................................................. 137/527.2
[58] Field of Search .................. 137/527.2, 527.8, 315, 137/326, 527, 527.4, 527.6, 520, 521; 251/298, 303

[56] References Cited

U.S. PATENT DOCUMENTS

| Re. 10,487 | 6/1884 | Blessing | 137/527.2 |
|---|---|---|---|
| 325,289 | 9/1885 | VanWie | 137/527.2 |
| 345,420 | 7/1886 | Eskholme | 137/527.2 |
| 1,561,395 | 11/1925 | Adams | 137/527.2 |
| 1,839,683 | 1/1932 | Laskowitz | 137/527 |
| 2,918,934 | 12/1959 | Wheatley | 137/527.2 |
| 2,923,317 | 2/1960 | McInerney | 137/527.2 |
| 3,060,961 | 10/1962 | Conley | 137/527.4 |
| 3,366,137 | 1/1968 | Hansen | 137/527.8 |
| 4,223,697 | 9/1980 | Pendleton | 137/527.8 |

FOREIGN PATENT DOCUMENTS

| 2721176 | 11/1978 | Fed. Rep. of Germany | 137/527.8 |
|---|---|---|---|
| 2913969 | 10/1980 | Fed. Rep. of Germany | 137/527.8 |

*Primary Examiner*—Robert G. Nilson
*Attorney, Agent, or Firm*—Arnold, White & Durkee

[57] ABSTRACT

The invention disclosed herein relates to a check valve clapper hanger mechanism from which a check valve clapper may be rotatably suspended in a check valve housing. The check valve clapper hanger mechanism is easily removable from the check valve housing and is capable of maintaining proper alignment of the clapper during normal operation of the check valve.

13 Claims, 2 Drawing Sheets

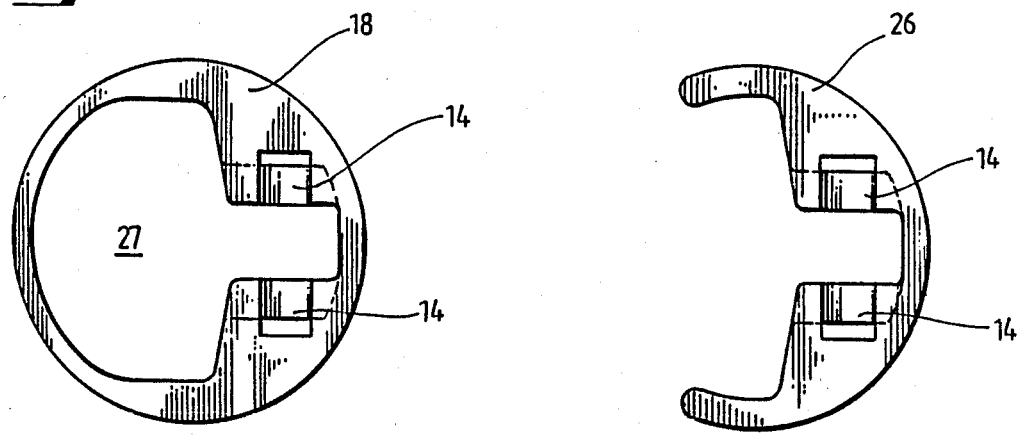
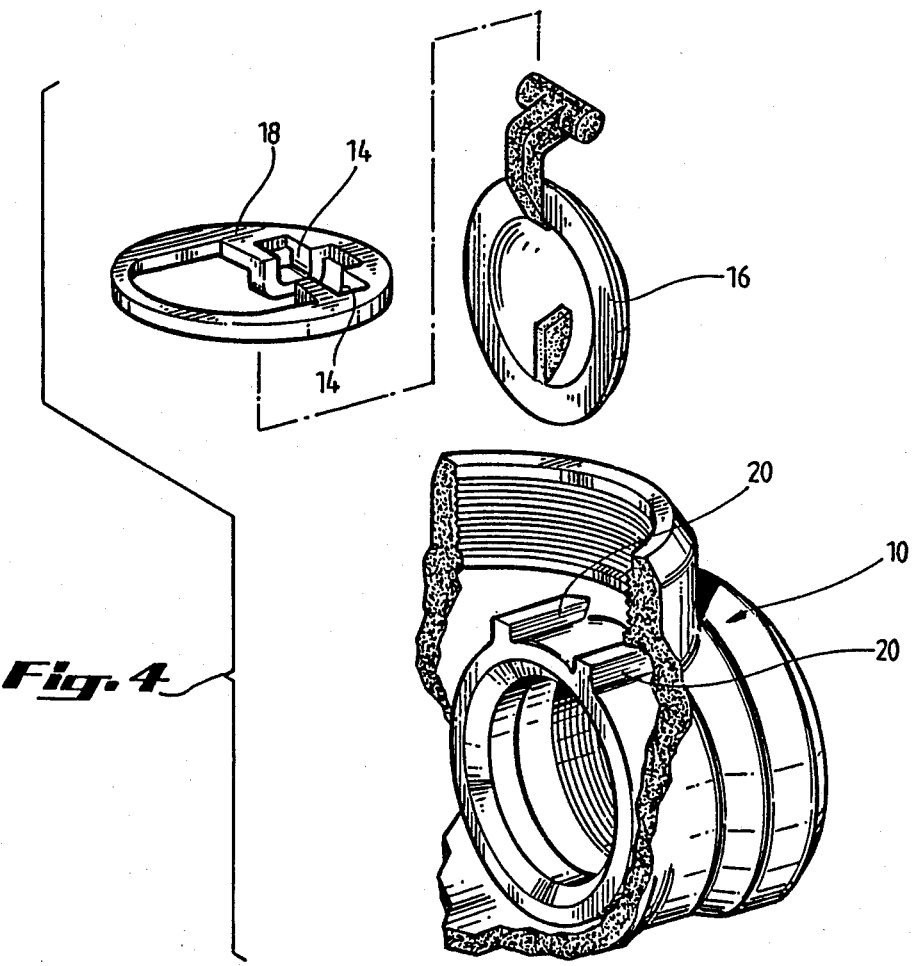

CHECK VALVE HANGER MECHANISM

CROSS-REFERENCE TO RELATED APPLICATIONS

This application is a continuation of the U.S. application Ser. No. 885,790 for a Check Valve Hanger Mechanism, filed July 15, 1986, now abandoned. Applicant incorporates said application Ser. No. 885,790 by reference herein, and claims the benefit of said application for all purposes pursuant to 37 C.F.R. 1.78.

BACKGROUND OF THE INVENTION

1. Field of the Invention

The present invention relates to swing-type check valves for use in pipelines and the like. The invention, more particularly, concerns a removable clapper support member from which a check valve clapper may be pivotably suspended. The present invention concerns a check valve clapper hanger which may be easily installed in and removed from a check valve housing and which provides bearing surfaces for the swinging movement of the clapper.

2. Description of the Prior Art

The most common type of check valve is a swing check valve consisting of a clapper pivotably mounted or hinged inside a check valve housing. Various methods of so mounting the clapper inside a check valve housing are known in the art. These methods employ various hinging arrangements.

In conventional swing check valves, the hanger mechanism from which the clapper is suspended is often an integral part of the valve housing. This type of integral structure unfortunately tends to substantially increase the complexity and cost of making the housing. The increased cost and complexity result from the interrupted cuts that are required in order to machine the clapper hanger in the housing.

Integral formation of the clapper hanger in the check valve housing also necessitates that the clapper hanger be made from the same material as the housing. In certain instances, particularly in highly corrosive or caustic environments, it may prove desirable to have a clapper hanger made with a higher quality, more expensive material than that used in the housing. Unfortunately, in integral hanger/housing structures, this requires that the same high quality metal alloys required for the clapper hanger also be used for the entire valve housing.

Other types of conventional check valves have employed removable clapper hangers. These check valves, however, have not met with wide success because they have been unable to retain the check valve clapper in its proper position inside the check valve housing.

Another drawback of conventional check valves employing removable clapper hangers is the complex, multi-step assembly process required to install the clapper in the clapper hanger. This multi-step process is necessitated by the fact that the clapper is suspended from a horizontally mounted cylinder or hinge which is mounted in adjacent holes in the clapper hanger. Such a configuration is shown in U.S. Pat. No. 3,060,961 to Conley and U.S. Pat. No. 2,923,317 to McInerney. Installation of the clapper disclosed in these two patents requires alignment of the holes in the clapper and clapper hanger followed by insertion of the hinge member through these holes. Disassembly of such a clapper valve requires the repetition of these steps in reverse order. The time required to perform this procedure increases the installation and maintenance costs of such valves.

SUMMARY OF THE INVENTION

The present invention provides a means for pivotably suspending a check valve clapper inside a check valve housing by using an easily removable clapper hanger. This clapper hanger is capable of maintaining proper alignment of the clapper during normal operation of the check valve. The removable nature of the hanger makes possible substantial savings in the cost of making the valve. Thus, the cost of making the housing can be reduced by permitting a continuous counterbore to be machined in the valve housing.

Furthermore, the clapper hanger can be made from a different material than that used to make the valve housing. This flexibility is extremely valuable in environments where high quality, expensive alloys are required for the clapper hanger but are not needed for the housing.

The clapper hanger of the invention will normally comprise a disc or plate-like piece containing an opening in its center. In a preferred embodiment, this opening is bulb-shaped.

As used herein, the term "bulb-shaped" refers to a shape similar to a lightbulb, i.e., having a narrow neck section at one end and a wide section with a curved top at the other end. The bulb-shaped arrangement permits quick, one-step installation and removal of the valve clapper in the clapper hanger.

The neck of the bulb-shaped opening, in the plane of the disc, will normally resemble a cross. In the arms of the cross are two recessed U-shaped members or trunnion bearings. These members are open at the top and project from the underside of the disc or plate on each side of the central neck section of the bulb-shaped opening. The two U-shaped members serve as cradle-like bearing surfaces for the trunnions attached to the clapper.

The clapper hanger is designed and sized to be inserted into the valve housing through an opening in the housing. The opening will normally be in the top of the housing and is adapted to be closed by the valve bonnet. The hanger seats on the housing in generally the same position as the hangers in conventional check valves.

The clapper can be dropped into position in the U-shaped arms of the clapper hanger, thus providing for one step assembly and disassembly. The ease of assembly is in vast contrast to the prior art devices, discussed above, which required pin and hole alignment.

In one preferred embodiment of the invention, the outer perimeter of the clapper hanger forms a complete circle. The diameter of the circle is slightly less than the diameter of the opening in the check valve housing in order to permit a loose fit. The check valve housing in this instance contains abutments which engage the outer sides of the U-shaped arms, thus preventing rotation of the clapper hanger within the opening in the housing.

In another preferred embodiment, the outer perimeter of the clapper hanger is shaped like the letter "C". The mouth of the C is radially opposite the neck section of the bulb-shaped opening contained in the clapper hanger. This C-shaped geometry permits the clapper hanger to be slightly larger than the opening in the housing, but capable of sufficient compression to be readily inserted into the housing. The force acting in opposition to this compression maintains the clapper hanger in proper alignment during normal operation of the check valve. Thus, the clapper hanger in this embodiment compression fits into the housing.

BRIEF DESCRIPTION OF THE DRAWINGS

FIGS. 3A and 3B are top views of two other embodiments of the clapper hanger.

FIG. 4 is an isometric, exploded view of a valve housing interior and clapper for use with the clapper hanger embodiment depicted in FIG. 3A.

DETAILED DESCRIPTION OF THE PREFERRED EMBODIMENTS

Figure 1:
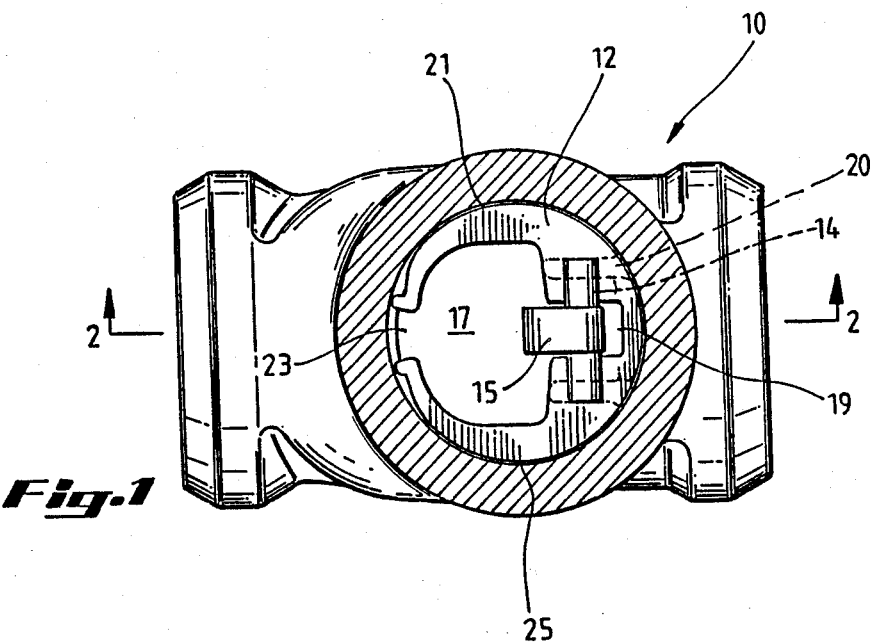
FIG. 1 is a top view of one embodiment of the clapper hanger installed in a check valve housing.

Referring to FIG. 1, the clapper hanger 12 is shown inserted in check valve housing 10 with the valve bonnet 13 (shown in FIG. 2) removed. U-shaped arms 14 are open at the top and project laterally from the underside of clapper hanger 12 on each side of the central neck section 15 of the bulb-shaped opening 17. The recess 19 in the clapper hanger directly above U-shaped arms 14 gives a cross-shaped appearance to the neck section of the bulb-shaped opening. Clapper hanger 12 has a C-shaped outer perimeter 21 with an opening 23 located radially opposite from U-shaped arms 14.

The clapper hanger 12 may be machined or otherwise fabricated such that its diameter is slightly greater than the diameter of the opening 25 in the valve housing 10. In this situation, the clapper hanger 12 is slightly compressed when it is inserted in the valve housing 10. The force acting in opposition to this compression maintains the clapper hanger 12 in proper alignment in the housing 10.

Figure 2:
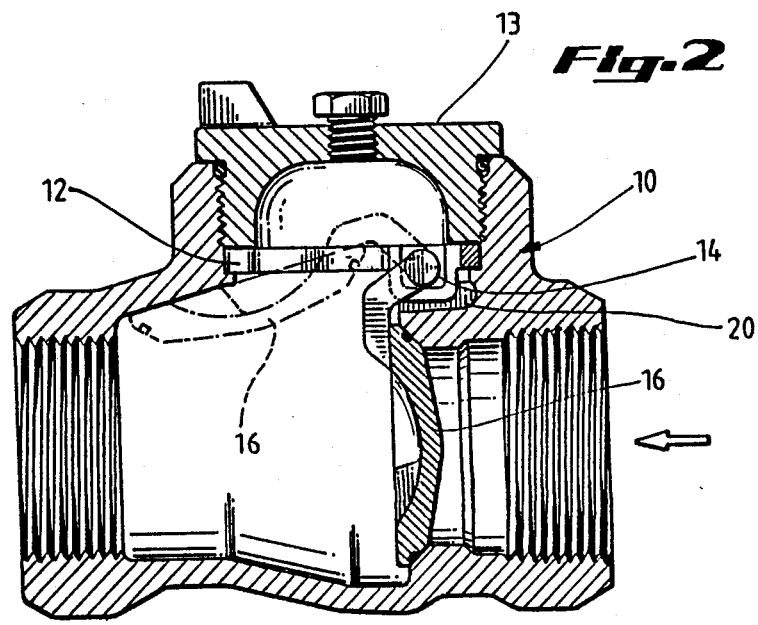
FIG. 2 is a cross-sectional view of the embodiment of FIG. 1 taken along the lines 2—2 of FIG. 1.

Referring to FIG. 2, the clapper hanger 12 and the clapper 16 are shown installed in valve housing 10. The clapper 16 is rotatably suspended from the U-shaped arms 14 on the underside of the clapper hanger 12. The clapper 16 is shown in phantom form is its fully open position.

Referring next to FIG. 3A, another embodiment of the clapper hanger of the invention is depicted. The clapper hanger 18 in this instance is circular in its outer shape, containing a bulb-shaped opening 27 in its center. The U-shaped arms 14 are mounted on the underside of the clapper hanger 18 in the same manner as depicted in FIG. 2. Since the clapper hanger 18 here is circular, a device such as a peg may be used to keep it in proper position relative to the other parts of the check valve.

Referring now to FIG. 3B, still another embodiment of the invention is depicted. The clapper hanger 26 here is substantially semicircular in its outer shape. The outer perimeter of clapper hanger 26 covers an arc slightly in excess of 180°. U-shaped arms 14 are open at the top and project from the underside of the clapper hanger 26 in the same manner as described for the clapper hanger 12 above.

The clapper hanger 26 may be machined such that its diameter is slightly greater than the diameter of the valve housing 10. In this situation, the clapper hanger 26 may be slightly compressed when it is inserted in the valve housing 10. The resulting force acting in opposition to this compression helps to maintain the clapper hanger 26 in proper alignment in the check valve housing 10 of FIGS. 1 and 2.

Referring to FIG. 4, the structural abutments 20 are shown on the inside of the valve housing 10 located beside the outer face of each U-shaped arm 14. The abutments 20 are laterally spaced such that the U-shaped arms 14 fit between them in very close tolerance This close tolerance inhibits lateral rotation of the clapper hanger 18, thus maintaining proper alignment of the clapper 16 inside the valve housing 10. Clapper hangers 12 and 26 can also be machined such that they will fit loosely in check valve housing 10 in the same manner as described for clapper hanger 18 in FIG. 3A. In these embodiments, the clapper hangers 12 and 26 are installed in a check valve housing with abutments 20 in order to help maintain proper alignment of clapper 16.

The ease of assembly and disassembly of clapper 16 and clapper hanger 18 is also depicted in FIG. 4. The openings at the top of U-shaped arms 14 permit clapper 16 to be dropped into place or lifted up in one step. This provides significant time and cost savings compared to pin and hole alignment type clapper assemblies.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

What is claimed is:

1. A check valve clapper hanger apparatus capable of suspending a check valve clapper in a check valve housing, comprising:
    a disc containing a bulb-shaped opening, said opening comprising a central neck section, and said disc adapted to seat on its underside within the housing of a check valve; and
    U-shaped arms open at the top projecting from the underside of said disc and located on each side of the central neck section of the bulb-shaped opening contained in said disc, said arms capable of receiving a check valve clapper that is dropped into place from above said arms.

2. The apparatus of claim 1 wherein said disc and said arms are integrally formed from the same piece of material.

3. The apparatus of claim 1 wherein said disc is circular.

4. The apparatus of claim 1 wherein said disc is C-shaped, having an opening located radially opposite from said U-shaped arms.

5. The apparatus of claim 1 wherein the periphery of said disc is semicircular in shape.

6. A clapper valve hanger for use in a swing check valve having a housing comprising a clapper hanger seat, a clapper with a pair of trunnions at one end, and a removable bonnet covering an opening in said housing, which comprises:
    a substantially flat member configured to be inserted into said opening and to seat within said housing and to be held on said seat between said housing and said bonnet; and
    a pair of cradle-like trunnion bearings open at the top and integral with and supported from and below said flat member, said bearings configured to receive the trunnions of said clapper from above said top opening and support said clapper in a trunnion/bearing relation.

7. A check valve assembly comprising:

a check valve housing having an opening in its top; a disc containing a bulb-shaped opening having a central neck section, said disc horizontally seated in said top opening of said check valve housing;

U-shaped arms open at the top and projecting from the underside of said disc and located on each side of the central neck section of the bulb-shaped opening contained in said disc; and a valve clapper insertable through the top opening in said U-shaped arms and suspended from said U-shaped arms.

8. The apparatus of claim 7 wherein said disc and said arms are integrally formed from the same piece of material.

9. The apparatus of claim 7 wherein said disc is circular.

10. The apparatus of claim 7 wherein said disc is C-shaped, having an opening located radially opposite from said U-shaped arms.

11. The apparatus of claim 7 wherein said disc is semicircular shaped.

12. The apparatus of claim 9 wherein said check valve housing contains abutments spaced such that said U-shaped arms fit between said abutments in close tolerance.

13. The apparatus of claim 11 wherein said check valve housing contains abutments spaced such that said U-shaped arms fit between said abutments in close tolerance.

* * * * *